US009429776B2

(12) United States Patent
Shi et al.

(10) Patent No.: US 9,429,776 B2
(45) Date of Patent: Aug. 30, 2016

(54) SILICON-BASED RIB-WAVEGUIDE MODULATOR AND FABRICATION METHOD THEREOF

(71) Applicant: SiFotonics Technologies Co., Ltd., Woburn, MA (US)

(72) Inventors: Tuo Shi, Beijing (CN); Changhua Chen, Beijing (CN); Yongbo Shao, Beijing (CN); Tzung-I Su, Zhongli (TW); Dong Pan, Andover, MA (US)

(73) Assignee: SIFOTONICS TECHNOLOGIES CO., LTD., Woburn, MA (US)

( * ) Notice: Subject to any disclaimer, the term of this patent is extended or adjusted under 35 U.S.C. 154(b) by 0 days.

(21) Appl. No.: 14/788,746

(22) Filed: Jun. 30, 2015

(65) Prior Publication Data

US 2015/0378185 A1 Dec. 31, 2015

Related U.S. Application Data

(60) Provisional application No. 61/998,504, filed on Jun. 30, 2014.

(51) Int. Cl.
| *G02F 1/035* | (2006.01) |
| *G02F 1/025* | (2006.01) |
| *G02F 1/225* | (2006.01) |
| *G02F 1/015* | (2006.01) |
| *G02F 1/21* | (2006.01) |

(52) U.S. Cl.
CPC .............. *G02F 1/025* (2013.01); *G02F 1/2257* (2013.01); *G02F 2001/0152* (2013.01); *G02F 2001/212* (2013.01)

(58) Field of Classification Search
CPC ................. G02F 1/025; G02F 1/2257; G02F 2001/0152
USPC ................. 385/2, 39, 40, 45, 27–28; 438/69
See application file for complete search history.

(56) References Cited

U.S. PATENT DOCUMENTS

| 6,845,198 B2 * | 1/2005 | Montgomery ........ G02F 1/2257 359/245 |
| 2016/0004104 A1 * | 1/2016 | Feng ....................... G02F 1/025 385/3 |

\* cited by examiner

*Primary Examiner* — Ellen Kim
(74) *Attorney, Agent, or Firm* — Han IP Corporation; Andy M. Han

(57) ABSTRACT

Various structures of an electro-optic device and fabrication methods thereof are described. A fabrication method is provided to fabricate an electro-optic device which may include a silicon-based rib-waveguide modulator which includes a first top silicon layer, having a first doped region that is at least partially doped with dopants of a first conducting type, a second top silicon layer, having a second doped region that is at least partially doped with dopants of a second conducting type, and a thin dielectric gate layer disposed between the first top silicon layer and the second top silicon layer. The second doped region may be at least in part directly over the first doped region. The modulator may also include a rib waveguide formed on the second top silicon layer, a first electric contact formed on the first top silicon layer, and a second electric contact formed on the second top silicon layer.

13 Claims, 6 Drawing Sheets

SILICON-BASED RIB-WAVEGUIDE MODULATOR AND FABRICATION METHOD THEREOF

CROSS-REFERENCE TO RELATED PATENT APPLICATION(S)

The present disclosure is a non-provisional application of, and claims the priority benefit of, U.S. Patent Application No. 61/998,504, filed on Jun. 30, 2014, which is herein incorporated by reference in its entirety.

TECHNICAL FIELD

The present disclosure is related to electro-optic devices. More particularly, the present disclosure is related to silicon-based rib-waveguide modulators and fabrication thereof.

BACKGROUND

In recent years, silicon modulators have attracted a lot of attention, due to their characteristics of easy integration, low power consumption, CMOS-process compatibility, and relatively smaller size. These benefits are keys to reducing the footprint and power consumption of optical transceiver modules for long-haul and metro telecommunication. In one approach, a MOS-structure based silicon modulator may achieve high speed modulation, benefiting from electro-optic effect. The active region may be 500-μm in length, rather small compared with traditional lithium-niobate (LiNbO3) Mach-Zehnder modulator. Meanwhile, the driving peak-to-peak voltage may be as small as 1.2V, exhibiting 9 dB extinction ratio.

However, in CMOS process, the poly-silicon layer is utilized as the gate layer of the optical waveguide, where high propagation loss is induced due to the absorption and scattering losses of grain boundaries, which results in a high insertion loss. Meanwhile, 100G long-haul coherent transmission has very high requirement of modulator extinction ratio performance, thus the length of MOS-structure silicon modulator has to be extended to achieve the high extinction ratio. This is because higher driving voltage is not a feasible method given the risk of oxide breakdown at higher voltage.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure provides a novel rib-type waveguide MOS-structure modulator and corresponding unique fabrication method thereof. Embodiments of the present disclosure reduce optic loss and allow length extension for the modulator to obtain higher extinction ratio.

In one aspect, an electro-optic device may include a silicon-based rib-waveguide modulator. The silicon-based rib-waveguide modulator may include: a first top silicon layer, a second top silicon layer, a thin dielectric gate layer disposed between the first top silicon layer and the second top silicon layer, a rib waveguide formed on the second top silicon layer, a first electric contact formed on the first top silicon layer, and a second electric contact formed on the second top silicon layer. The first top silicon layer may include a first doped region that is at least partially doped with dopants of a first conducting type. The second top silicon layer may include a second doped region that is at least partially doped with dopants of a second conducting type. The second doped region of the second top silicon layer may be at least in part directly over the first doped region of the first top silicon layer. The thin dielectric gate layer may include a first side in contact with the first top silicon layer and a second side in contact with the second top silicon layer. When electric signals are applied on the first and second electric contacts, free carriers may accumulate, deplete, or invert within the first and second top silicon layers on the first and second sides of the thin dielectric gate layer simultaneously and a refractive index of the rib waveguide confining optical field may be modulated.

In one aspect, a fabrication method of an electro-optic device may include a number of operations including, but not limited to, the following: forming a first silicon-on-insulator (SOI) wafer that comprises a first silicon substrate, a first buried oxide (BOX) layer, and a first top silicon layer which is formed over the first BOX layer; performing a first ion-implantation process to form a first doped region in the first top silicon layer, the first doped region being at least partially doped with dopants of a first conducting type; performing a first thermal treat process to form a first thin dielectric layer over the first top silicon layer; preparing a second SOI wafer that comprises a second silicon substrate, a second BOX layer, and a second top silicon layer which is formed over the second BOX layer; performing a wafer bonding process to combine the first SOI wafer and the second SOI wafer, with the second top silicon layer bonded face-to-face to the thin dielectric layer; performing a grinding process and a first dry-etching process to remove the second silicon substrate of the second SOI wafer, using the second BOX layer as a stop layer for the first dry-etching process; performing a second dry-etching process to remove the second BOX layer, using the second top silicon layer as a stop layer for the second dry-etching process; performing a second ion-implantation process to form a second doped region in the second top silicon layer, the second doped region being at least partially doped with dopants of a second conducting type; performing a third dry-etching process to form a rib waveguide on the second top silicon layer; and performing a passivation process and a metallization process to form a first electric contact on the first top silicon layer and a second electric contact formed on the second top silicon layer.

In one aspect, a fabrication method of an electro-optic device may include a number of operations including, but not limited to, the following: preparing a first SOI wafer that comprises a first silicon substrate, a first BOX layer, and a first top silicon layer which is formed over the first BOX layer; performing a first thermal treat process to form first a thin dielectric layer over the first top silicon layer; preparing a second SOI wafer that comprises a second silicon substrate, a second BOX layer, and a second top silicon layer which is formed over the second BOX layer; performing a wafer bonding process to combine the first SOI wafer and the second SOI wafer, with the second top silicon layer bonded face-to-face to the thin dielectric layer; performing a grinding process and a first dry-etching process to remove the second silicon substrate of the second SOI wafer, using the second BOX layer as a stop layer for the first dry-etching process; performing a second dry-etching process to remove the second BOX layer, using the second top silicon layer as a stop layer for the second dry-etching process; performing a third dry-etching process to form a rib waveguide on the second top silicon layer, wherein a window region of the second top silicon layer is etched down to the thin dielectric layer; performing a first ion-implantation process to implant, through the window region, impurities of a first type into the first top silicon layer; performing a third thermal treat process to cause lateral diffusion of the impurities of the first type to form a first conducting-type region in the first top silicon layer; performing a second ion-implantation process to form a second conducting-type region in the second top silicon layer with impurities of a second type; and performing a passivation process and a metallization process to form a first electric contact on the first top silicon layer and a second electric contact formed on the second top silicon layer.

In one aspect, an electro-optic device may include a silicon-based rib-waveguide modulator. The silicon-based rib-waveguide modulator may include: a first top silicon region, a thick dielectric layer, a second top silicon region, a thin dielectric gate layer, a rib waveguide formed on the second top silicon region, a first electric contact formed on the first top silicon region, and a second electric contact formed on the second top silicon region. The first top silicon region may be at least partially doped to exhibit electrical conductivity of a first type. The thick dielectric layer may have a thickness approximately identical to a thickness of the first top silicon region. The thick dielectric layer may fill a space of a plane of the first top silicon region. The second top silicon region may be at least partially doped to exhibit electrical conductivity of a second type. The second top silicon region may be at least in part directly over the first top silicon region. The thin dielectric gate layer may be disposed between the first top silicon region and the second top silicon region, and may include a first side in contact with the first top silicon region and a second side in contact with the second top silicon region. When electric signals are applied on the first and second electric contacts, free carriers may accumulate, deplete, or invert within the first and second top silicon regions on the first and second sides of the thin dielectric gate layer simultaneously and a refractive index of the rib waveguide confining optical field may be modulated.

In one aspect, a fabrication method of an electro-optic device may include a number of operations including, but not limited to, the following: preparing a first SOI wafer that comprises a first silicon substrate, a first BOX layer, and a first top silicon layer which is formed over the first BOX layer; performing a first ion-implantation process to form a first doped region in the first top silicon layer, the first doped region at least partially doped to exhibit electrical conductivity of a first type; performing a first dry-etching process to etch parts of the first top silicon layer down to the first BOX layer to form a first top silicon region with at least a portion of the first doped region preserved; performing a thick dielectric deposition process to form a thick dielectric layer with a thickness sufficient to entirely cover the first top silicon region; performing a chemical-mechanical polishing (CMP) process to planarize the thick dielectric layer to remove a part of the thick dielectric layer that is above the first top silicon region; performing a first thermal treat process to form a first thin dielectric layer over the first top silicon region; preparing a second SOI wafer that comprises a second silicon substrate, a second BOX layer, and a second top silicon region which is formed over the second BOX layer; performing a wafer bonding process to combine the first SOI wafer and the second SOI wafer with the second top silicon layer bonded face-to-face to the thin dielectric layer; performing a grinding process and a second dry-etching process to remove the second silicon substrate of the second SOI wafer, using the second BOX layer as a stop layer for the second dry-etching process; performing a third dry-etching process to remove the second BOX layer, using the second top silicon region as a stop layer for the third dry-etching process; performing a second ion-implantation process to form a second doped region in the second top silicon region, the second doped region at least partially doped to exhibit electrical conductivity of a second type, the second doped region at least in part directly over the first doped region; performing a fourth dry-etch process to form the rib waveguide on the second top silicon region; and performing a passivation process and a metallization process to form a first electric contact on the first top silicon region and a second electric contact formed on the second top silicon region.

In one aspect, a Mach-Zehnder interferometer may include an input optical waveguide splitter and an output optical waveguide combiner. The input optical waveguide splitter may include a first arm, a second arm, and an input waveguide part optically coupled to the first arm and the second arm which are positioned in parallel. The output optical waveguide combiner may include an output waveguide part optically coupled to the first arm and the second arm of the input optical waveguide splitter. The first arm of the input optical waveguide splitter may include a first electro-optic phase modulator. The first electro-optic phase modulator may include: a first top silicon layer, a second top silicon layer, a thin dielectric gate layer disposed between the first top silicon layer and the second top silicon layer, a rib waveguide formed on the second top silicon layer, a first electric contact formed on the first top silicon layer, and a second electric contact formed on the second top silicon layer. The first top silicon layer may be at least partially doped to exhibit electrical conductivity of a first type. The second top silicon layer may be at least partially doped to exhibit electrical conductivity of a second type. A doped region of the second top silicon layer may be at least in part directly over a doped region of the first top silicon layer. When electric signals are applied on the first and second electric contacts, free carriers may accumulate, deplete, or invert within the first and second top silicon layers on the first and second sides of the thin dielectric gate layer simultaneously and a refractive index of the rib waveguide confining optical field may be modulated.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter.

DETAILED DESCRIPTION OF THE PREFERRED EMBODIMENTS

Figure 1:
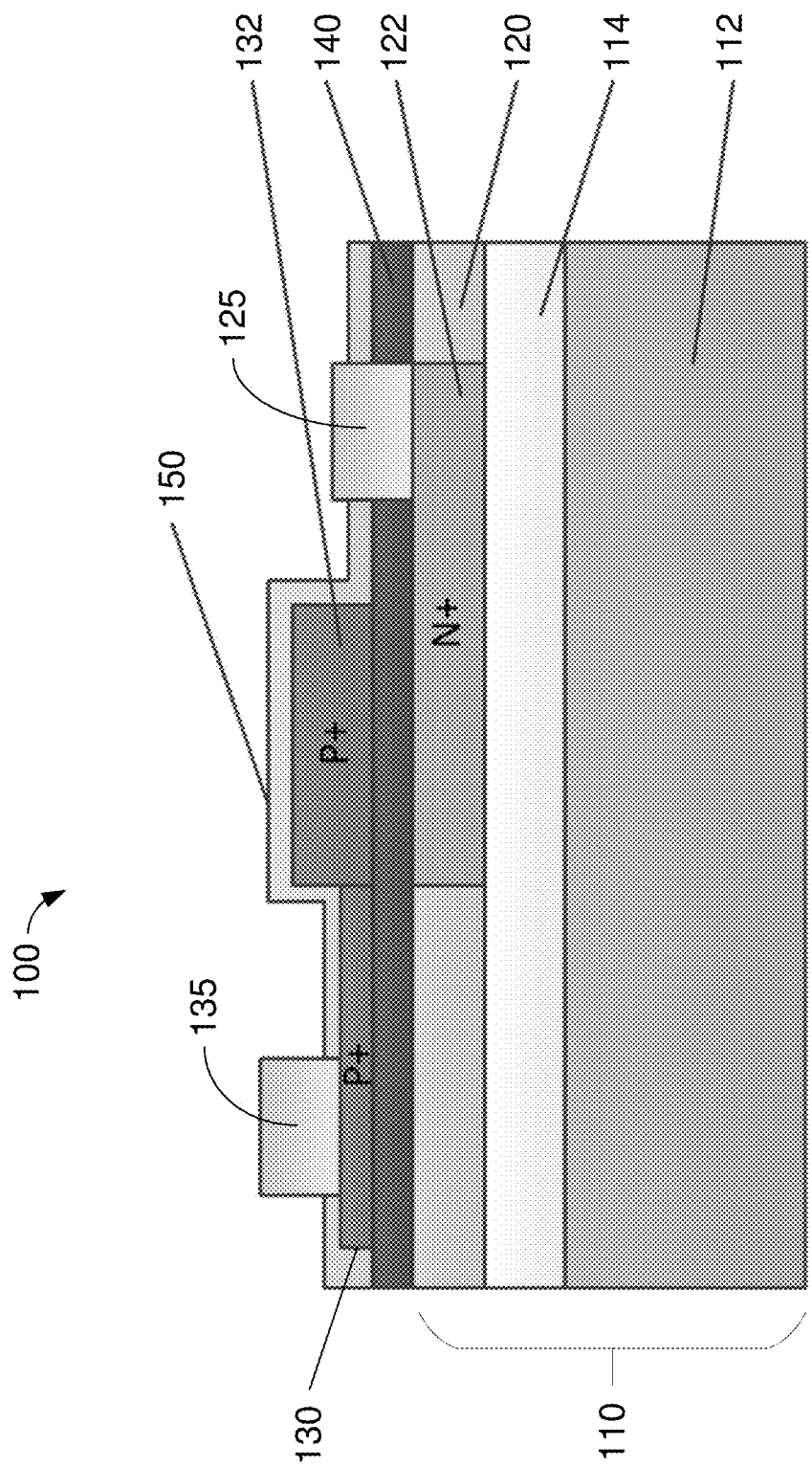
FIG. 1 is a cross-sectional view of an electro-optic structure of a silicon-based rib-waveguide modulator in accordance with an embodiment of the present disclosure.

FIG. 1 illustrates a cross-sectional view of an electro-optic structure of a silicon-based rib-waveguide modulator 100 in accordance with an embodiment of the present disclosure. Silicon-based rib-waveguide modulator 100 may be implemented in an electro-optic device.

Referring to FIG. 1, silicon-based rib-waveguide modulator 100 may include a first top silicon layer 120, a second top silicon layer 130, and a thin dielectric gate layer 140. The first top silicon layer 120 may include a first doped region 122 that is at least partially doped with dopants of a first conducting type, e.g., N type dopants. For example, the first doped region 122 may be an N+ region. The second top silicon layer 130 may include a second doped region 132 that is at least partially doped with dopants of a second conducting type, e.g., P type dopants. For example, the second doped region 132 may be a P+ region. The second doped region 132 of the second top silicon layer 130 may be at least in part directly over the first doped region 122 of the first top silicon layer 120. The thin dielectric gate layer 140 may be disposed between the first top silicon layer 120 and the second top silicon layer 130. The thin dielectric gate layer 140 may include a first side (e.g., the top side shown in FIG. 1) in contact with the first top silicon layer 120 and a second side (e.g., the bottom side shown in FIG. 1) in contact with the second top silicon layer 130. Silicon-based rib-waveguide modulator 100 may also include a rib waveguide (not shown) formed on the second top silicon layer 130, a first electric contact 125 formed on the first top silicon layer 120, and a second electric contact 135 formed on the second top silicon layer 130. Silicon-based rib-waveguide modulator 100 may further include a passivation layer 150 formed on the second top silicon layer 130 and the second doped region 132.

In operation, when electric signals are applied on the first and second electric contacts 125 and 135, free carriers in the silicon-based rib-waveguide modulator 100 may accumulate, deplete, or invert within the first and second top silicon layers 120 and 130 on the first and second sides of the thin dielectric gate layer 140 simultaneously. Moreover, a refractive index of the rib waveguide confining optical field may be modulated. That is, the phase of a guiding light may be modulated.

In some embodiments, at least one of the first top silicon layer 120 and the second top silicon layer 130 may be made of single-crystal silicon.

Figure 2:
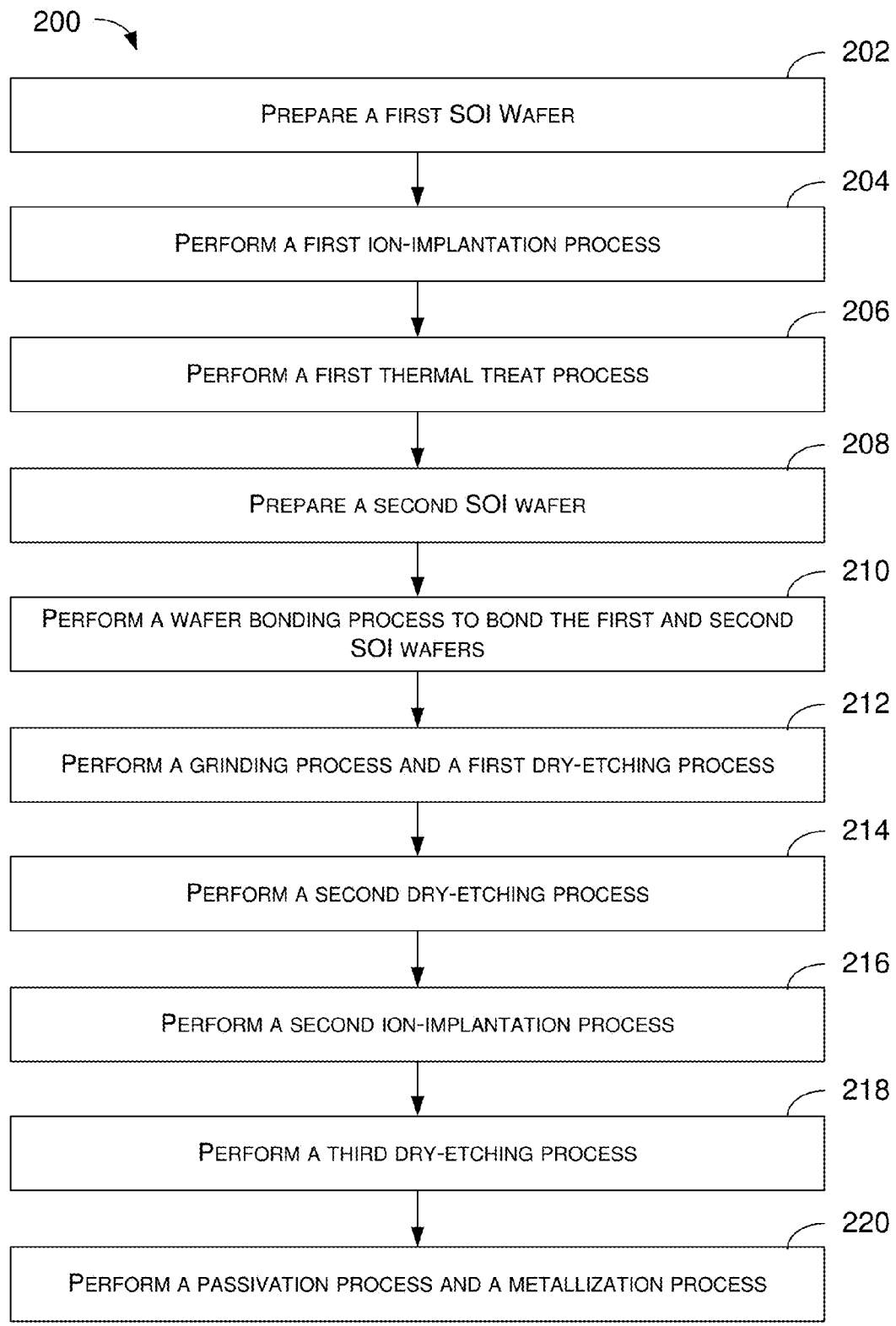
FIG. 2 is a flowchart of a fabrication process of an electro-optic device in accordance with an embodiment of the present disclosure.

FIG. 2 is a flowchart of a process 200 of fabrication of an electro-optic device of FIG. 1 in accordance with an embodiment of the present disclosure.

Process 200 may be utilized to fabricate the silicon-based rib-waveguide modulator 100 of an electro-optic device of FIG. 1. Process 200 may include a number of operations including, but not limited to, those shown in FIG. 2. Although operations 202-220 in FIG. 2 are shown in a particular order, in various embodiments some of the operations 202-220 may be implemented in orders different from that shown in FIG. 2. Moreover, some of the operations 202-220 may be implemented in parallel and not necessarily in series as shown in FIG. 2. For illustrative purpose, the following description of process 200 refers to silicon-based rib-waveguide modulator 100 of FIG. 1.

At 202, process 200 may involve preparing a first silicon-on-insulator (SOI) wafer 110 that includes a first silicon substrate 112, a first buried oxide (BOX) layer 114, and a first top silicon layer 120 which is formed over the first BOX layer 114.

At 204, process 200 may involve performing a first ion-implantation process to form a first doped region 122 in the first top silicon layer 120. The first doped region may be at least partially doped with dopants of a first conducting type, e.g., N type dopants.

At 206, process 200 may involve performing a first thermal treat process to form a first thin thermal oxidized dielectric layer 140 over the first top silicon layer 120.

At 208, process 200 may involve preparing a second SOI wafer (not shown) that includes a second silicon substrate (not shown), a second BOX layer (not shown), and a second top silicon layer 130 which is formed over the second BOX layer.

At 210, process 200 may involve performing a wafer bonding process to combine the first SOI wafer 110 and the second SOI wafer, with the second top silicon layer 130 bonded face-to-face to the thin dielectric layer 140.

At 212, process 200 may involve performing a grinding process and a first dry-etching process to remove the second substrate layer of the second SOI wafer, using the second BOX layer as a stop layer for the first dry-etching process.

At 214, process 200 may involve performing a second dry-etching process to remove the second BOX layer, using the second top silicon layer 130 as a stop layer for the second dry-etching process.

At 216, process 200 may involve performing a second ion-implantation process to form a second doped region 132 in the second top silicon layer 130. The second doped region 132 may be at least partially doped with dopants of a second conducting type, e.g., P type dopants.

At 218, process 200 may involve performing a third dry-etching process to form a rib waveguide (not shown) on the second top silicon layer 130.

At 220, process 200 may involve performing a passivation process and a metallization process to form a first electric contact 125 on the first top silicon layer 120 and a second electric contact 135 formed on the second top silicon layer 130.

In at least some embodiments, process 200 may also involve performing a second thermal treat process on the second SOI wafer to form a second thin dielectric layer over the second top silicon layer. Process 200 may further involve performing a wafer bonding process to combine the first SOI wafer and the second SOI wafer, with the second thin dielectric layer bonded face-to-face to the first thin dielectric layer.

Figure 3:
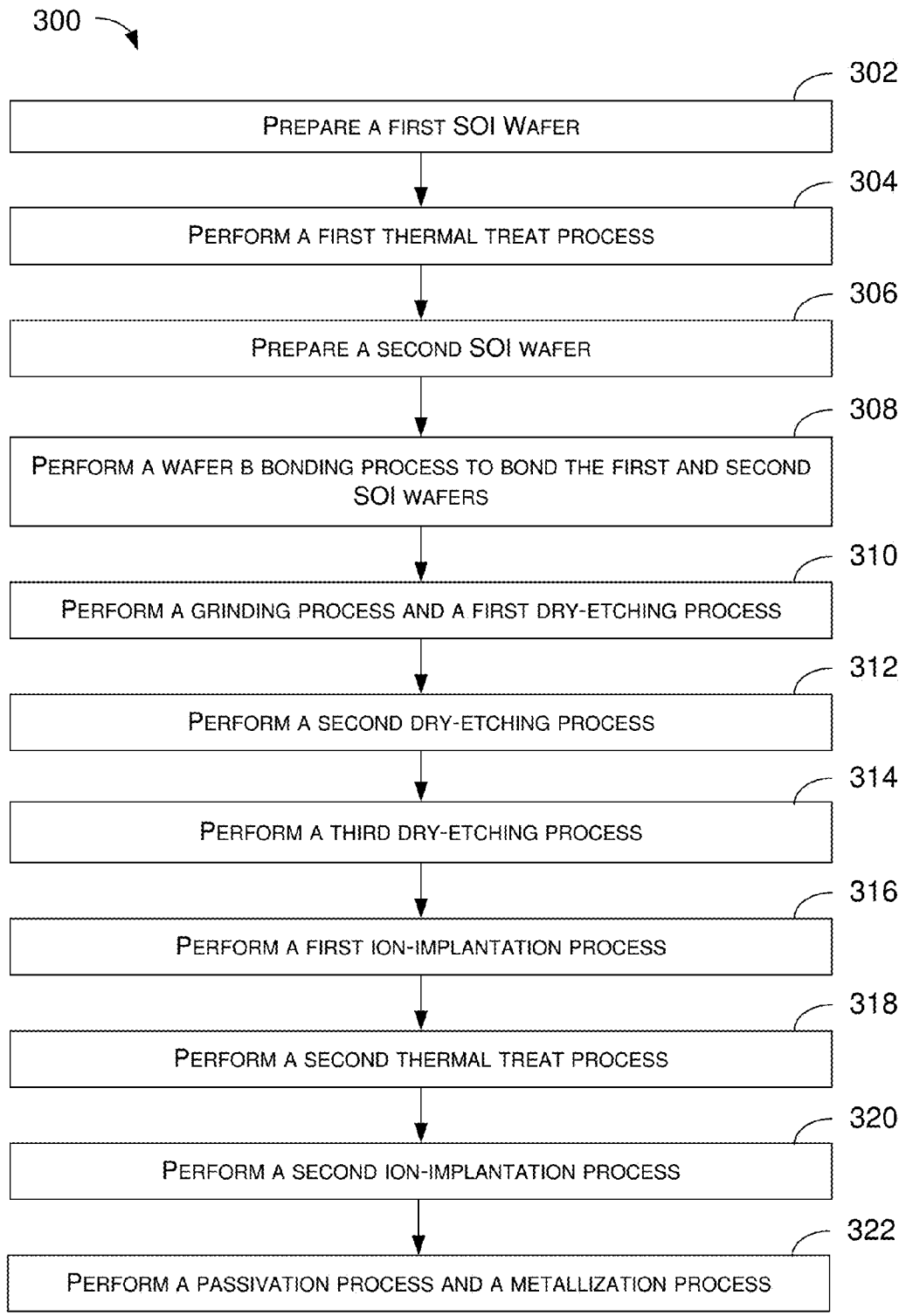
FIG. 3 is a flowchart of a fabrication process of an electro-optic device in accordance with another embodiment of the present disclosure.

FIG. 3 is a flowchart of a process 300 of fabrication of an electro-optic device of FIG. 1 in accordance with another embodiment of the present disclosure.

Process 300 may be utilized to fabricate the silicon-based rib-waveguide modulator 100 of an electro-optic device of FIG. 1. Process 300 may include a number of operations including, but not limited to, those shown in FIG. 3. Although operations 302-322 in FIG. 3 are shown in a particular order, in various embodiments some of the operations 302-322 may be implemented in orders different from that shown in FIG. 3. Moreover, some of the operations 302-322 may be implemented in parallel and not necessarily in series as shown in FIG. 3. For illustrative purpose, the following description of process 300 refers to silicon-based rib-waveguide modulator 100 of FIG. 1.

At 302, process 300 may involve preparing a first SOI wafer 110 that includes a first silicon substrate 112, a first BOX layer 114, and a first top silicon layer 120 which is formed over the first BOX layer 114.

At 304, process 300 may involve performing a first thermal treat process to form a first thin thermal oxidized dielectric layer 140 over the first top silicon layer 120.

At 306, process 300 may involve preparing a second SOI wafer (not shown) that includes a second silicon substrate (not shown), a second BOX layer (not shown), and a second top silicon layer 130 which is formed over the second BOX layer.

At 308, process 300 may involve performing a wafer bonding process to combine the first SOI wafer 110 and the second SOI wafer, with the second top silicon layer 130 bonded face-to-face to the thin dielectric layer 140.

At 310, process 300 may involve performing a grinding process and a first dry-etching process to remove the second silicon substrate of the second SOI wafer, using the second BOX layer as a stop layer for the first dry-etching process.

At 312, process 300 may involve performing a second dry-etching process to remove the second BOX layer, using the second top silicon layer 130 as a stop layer for the second dry-etching process.

At 314, process 300 may involve performing a third dry-etching process to form a rib waveguide (not shown) on the second top silicon layer 130. A window region (not shown) of the second top silicon layer 130 may be etched down to the thin dielectric layer 140.

At 316, process 300 may involve performing a first ion-implantation process to implant, through the window region, impurities or dopants of a first type, e.g., N type, into the first top silicon layer 120.

At 318, process 300 may involve performing a third thermal treat process to cause lateral diffusion of the impurities of the first type to form a first conducting-type region or a first doped region 122 in the first top silicon layer 120.

At 320, process 300 may involve performing a second ion-implantation process to form a second conducting-type region or a second doped region 132 in the second top silicon layer 130 with impurities or dopants of a second type, e.g., P type.

At 322, process 300 may involve performing a passivation process and a metallization process to form a first electric contact 125 on the first top silicon layer 120 and a second electric contact 135 formed on the second top silicon layer 130.

In at least some embodiments, process 300 may also involve performing a second thermal treat process on the second SOI wafer to form a second thin dielectric layer over the second top silicon layer. Process 300 may further involve performing a wafer bonding process to combine the first SOI wafer and the second SOI wafer, with the second thin dielectric layer bonded face-to-face to the first thin dielectric layer.

Figure 4:
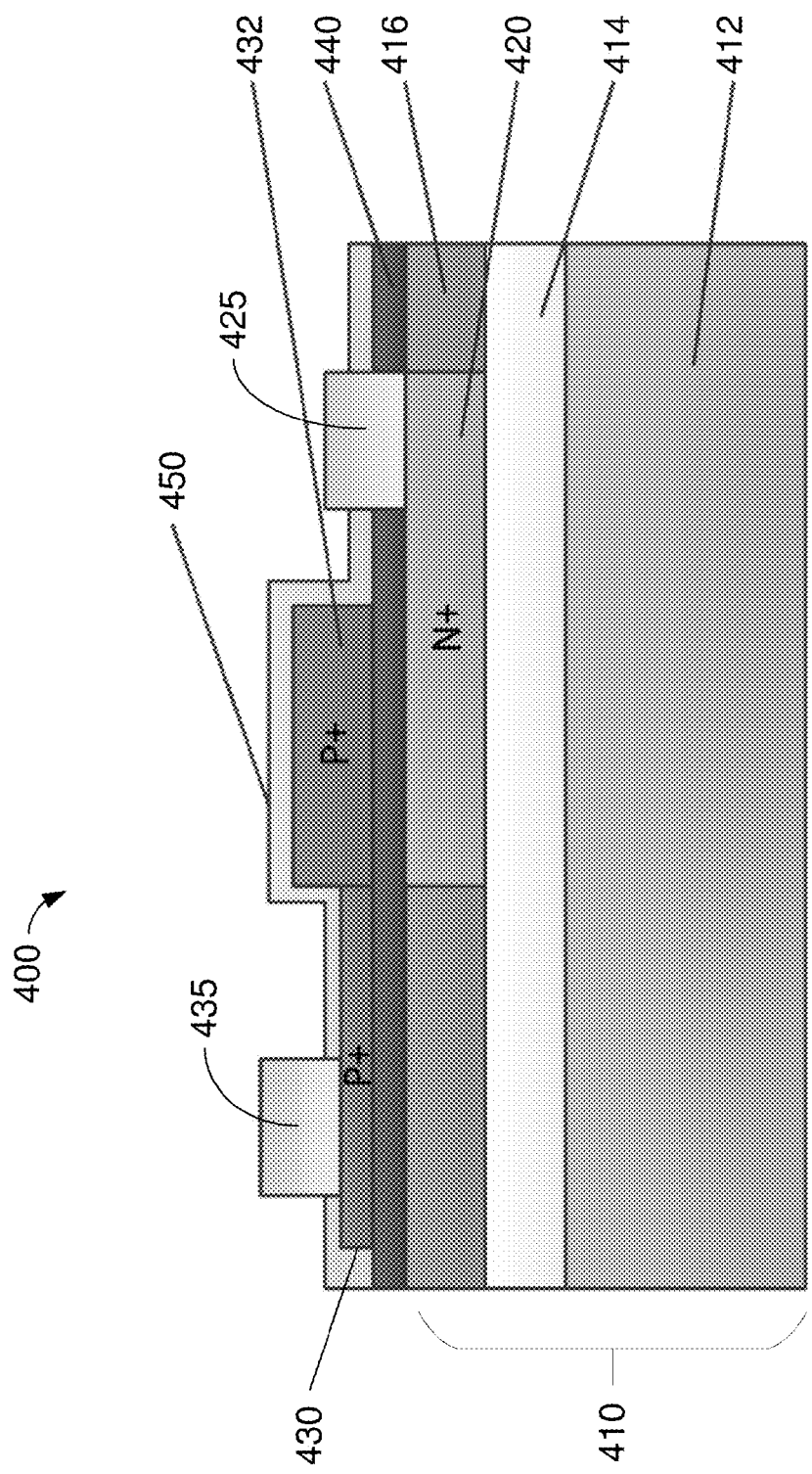
FIG. 4 is a cross-sectional view of an electro-optic structure of a silicon-based rib-waveguide modulator in accordance with another embodiment of the present disclosure.

FIG. 4 illustrates a cross-sectional view of an electro-optic structure of a silicon-based rib-waveguide modulator 400 in accordance with another embodiment of the present disclosure. Silicon-based rib-waveguide modulator 400 may be implemented in an electro-optic device.

Referring to FIG. 4, silicon-based rib-waveguide modulator 400 may include a first top silicon region 420, a second top silicon region 430, a thick dielectric layer 416, and a thin dielectric gate layer 440. The first top silicon region 420 may be at least partially doped to exhibit electrical conductivity of a first type, e.g., N type. For example, the first top silicon layer 420 may be an N+ region. The thick dielectric layer 416 may have a thickness approximately identical to a thickness of the first top silicon region 420, and the thick dielectric layer 416 may fill any remaining space of a plane where the first top silicon region 420 is disposed. The second top silicon region 430 may be at least partially doped to exhibit electrical conductivity of a second type, e.g., P type. For example, the second top silicon layer 430 may be a P+ region. The second top silicon region 430 may be at least in part directly over the first top silicon region 420. The thin dielectric gate layer 440 may be disposed between the first top silicon region 420 and the second top silicon region 430. The thin dielectric gate layer 440 may include a first side in contact with the first top silicon region 420 and a second side in contact with the second top silicon region 430. Silicon-based rib-waveguide modulator 400 may also include a rib waveguide (not shown) formed on the second top silicon region 430, a first electric contact 425 formed on the first top silicon region 420, and a second electric contact 435 formed on the second top silicon region 430. Silicon-based rib-waveguide modulator 400 may further include a passivation layer 450 formed on the second top silicon region 430.

In operation, when electric signals are applied on the first and second electric contacts 425 and 435, free carriers in the silicon-based rib-waveguide modulator 400 may accumulate, deplete, or invert within the first and second top silicon regions 420 and 430 on the first and second sides of the thin dielectric gate layer 440 simultaneously. Additionally, a refractive index of the rib waveguide confining optical field may be modulated. That is, the phase of a guiding light may be modulated.

In some embodiments, at least one of the first top silicon region 420 and the second top silicon region 430 may be made of single-crystal silicon.

Figure 5:
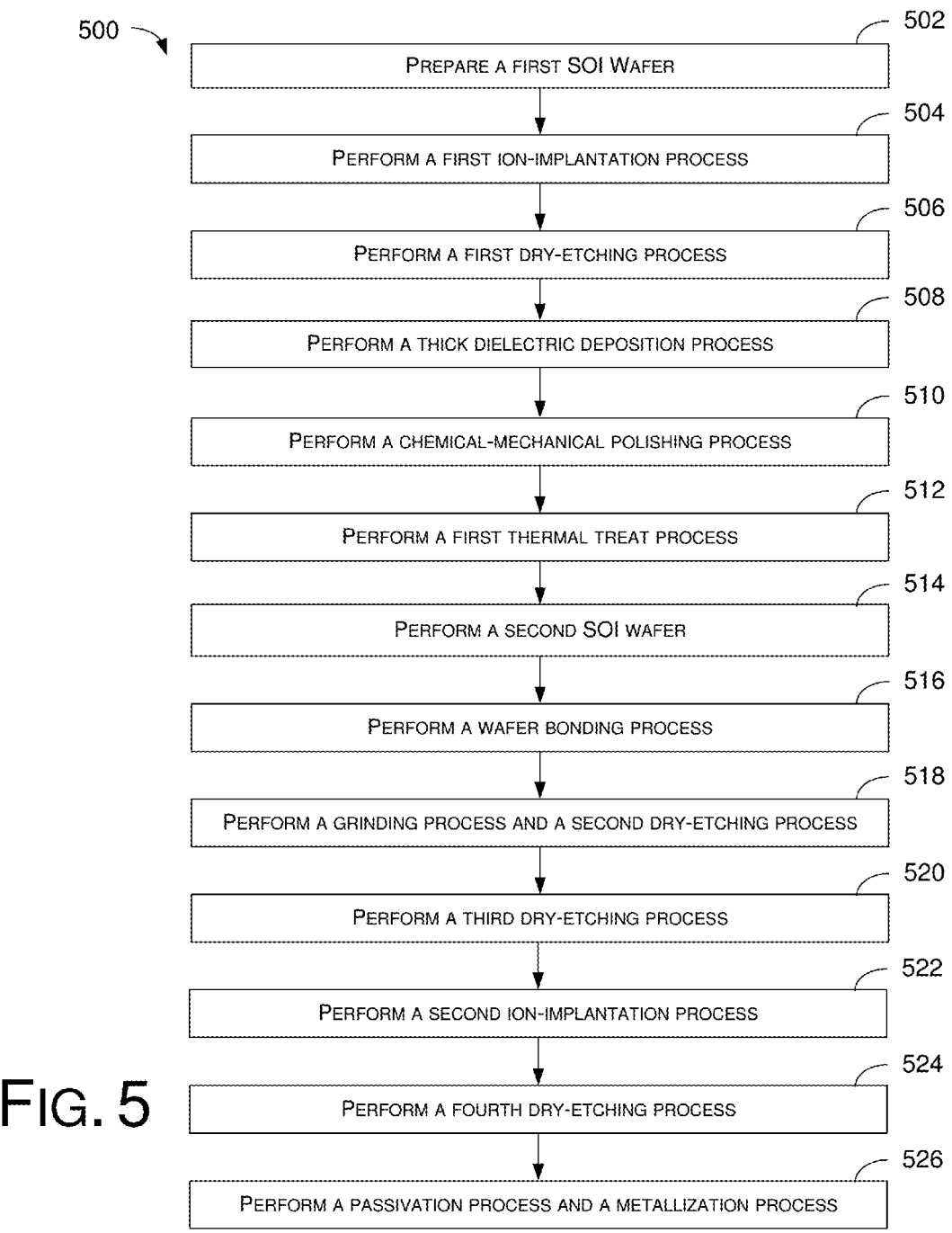
FIG. 5 is a flowchart of a fabrication process of an electro-optic device in accordance with an embodiment of the present disclosure.

FIG. 5 is a flowchart of a process 500 of fabrication of an electro-optic device of FIG. 4 in accordance with an embodiment of the present disclosure.

Process 500 may be utilized to fabricate the silicon-based rib-waveguide modulator 400 of an electro-optic device of FIG. 4. Process 500 may include a number of operations including, but not limited to, those shown in FIG. 5. Although operations 502-526 in FIG. 5 are shown in a particular order, in various embodiments some of the operations 502-526 may be implemented in orders different from that shown in FIG. 5. Moreover, some of the operations 502-526 may be implemented in parallel and not necessarily in series as shown in FIG. 5. For illustrative purpose, the following description of process 500 refers to silicon-based rib-waveguide modulator 400 of FIG. 4.

At 502, process 500 may involve preparing a first SOI wafer 410 that includes a first silicon substrate 412, a first BOX layer 414, and a first top silicon layer (not shown) which is formed over the first BOX layer 414.

At 504, process 500 may involve performing a first ion-implantation process to form a first doped region in the first top silicon layer. The first doped region may be at least partially doped to exhibit electrical conductivity of a first type, e.g., N type.

At 506, process 500 may involve performing a first dry-etching process to etch parts of the first top silicon layer down to the first BOX layer 414 to form a first top silicon region 420 with at least a portion of the first doped region preserved.

At 508, process 500 may involve performing a thick dielectric deposition process to form a thick dielectric layer 416 with a thickness sufficient to entirely cover the first top silicon region 420.

At 510, process 500 may involve performing a CMP process to planarize the thick dielectric layer 416 to remove a part of the thick dielectric layer 416 that is above the first top silicon region 420.

At 512, process 500 may involve performing a first thermal treat process to form a first thin thermal oxidized dielectric layer 440 over the first top silicon region 420.

At 514, process 500 may involve preparing a second SOI wafer (not shown) that includes a second silicon substrate (not shown), a second BOX layer (not shown), and a second top silicon region 430 which is formed over the second BOX layer.

At 516, process 500 may involve performing a wafer bonding process to combine the first SOI wafer 410 and the second SOI wafer with the second top silicon region 430 bonded face-to-face to the thin dielectric layer 440.

At 518, process 500 may involve performing a grinding process and a second dry-etching process to remove the second substrate layer of the second SOI wafer, using the second BOX layer as a stop layer for the second dry-etching process.

At 520, process 500 may involve performing a third dry-etching process to remove the second BOX layer, using the second top silicon region 430 as a stop layer for the third dry-etching process.

At 522, process 500 may involve performing a second ion-implantation process to form a second doped region 432 in the second top silicon region 430. The second doped region 432 may be at least partially doped to exhibit electrical conductivity of a second type, e.g., P type. The second doped region 432 may be at least in part directly over the first doped region of the first top silicon region 420.

At 524, process 500 may involve performing a fourth dry-etch process to form a rib waveguide (not shown) on the second top silicon region 430.

At 526, process 500 may involve performing a passivation process and a metallization process to form a first electric contact 425 on the first top silicon region 420 and a second electric contact 435 formed on the second top silicon region 430.

In at least some embodiments, process 500 may also involve performing a second thermal treat process on the second SOI wafer to form a second thin dielectric layer over the second top silicon layer. Process 500 may further involve performing a wafer bonding process to combine the first SOI wafer and the second SOI wafer, with the second thin dielectric layer bonded face-to-face to the first thin dielectric layer.

Figure 6:
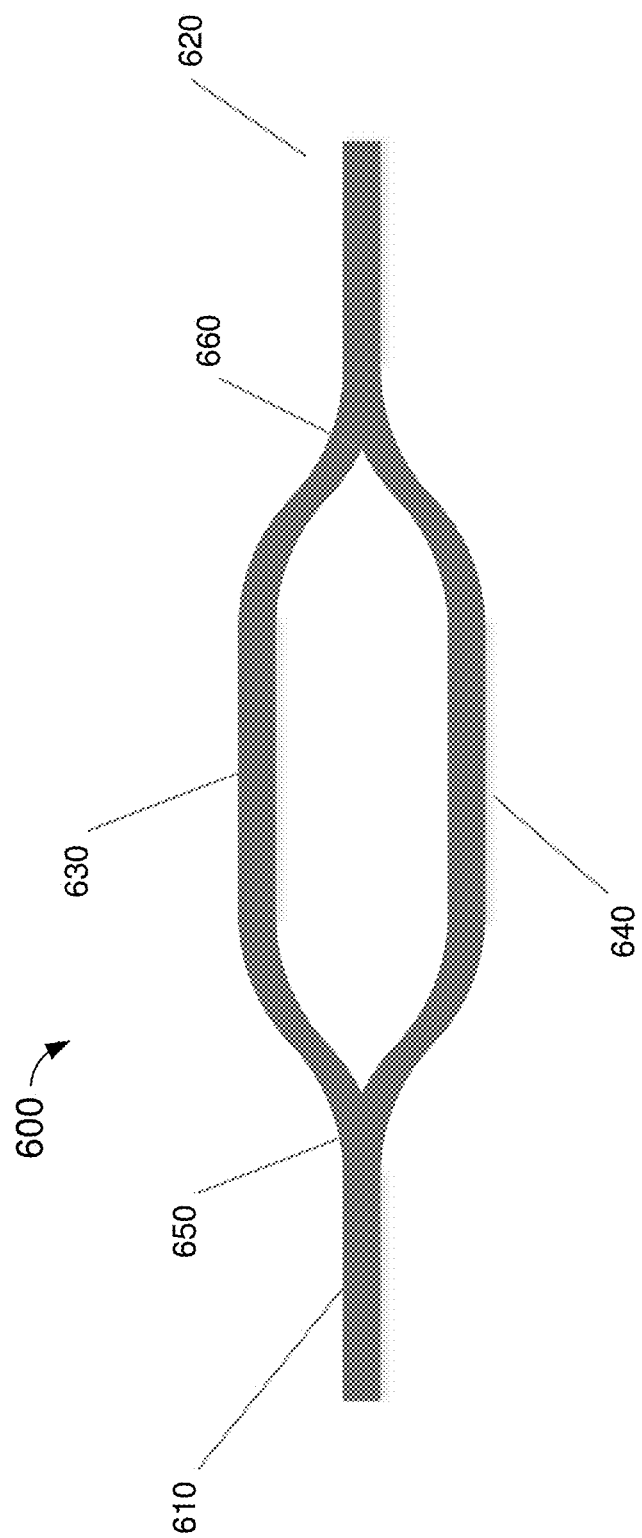
FIG. 6 is a schematic diagram of a Mach-Zehnder interferometer in accordance with an embodiment of the present disclosure.

FIG. 6 illustrates a Mach-Zehnder interferometer 600 in accordance with an embodiment of the present disclosure.

Referring to FIG. 6, Mach-Zehnder interferometer 600 may include an input optical waveguide splitter having an input waveguide part 610 and a splitter 650. Mach-Zehnder interferometer 600 may also include an output optical waveguide combiner having an output waveguide part 620 and a combiner 660. The input optical waveguide splitter may include a first arm 630 and a second arm 640 which are positioned in parallel. The input waveguide part 610 may be optically coupled to the first arm 630 and the second arm 640. The output waveguide part 620 may be optically coupled to the first arm 630 and the second arm 640 of the input optical waveguide splitter. The first arm 630 of the input optical waveguide splitter may include a first electro-optic phase modulator, e.g., silicon-based rib-waveguide modulator 100 or silicon-based rib-waveguide modulator 400 as described above. The first electro-optic phase modulator may include a first top silicon layer, a second top silicon layer, and a thin dielectric gate layer disposed between the first top silicon layer and the second top silicon layer. The first top silicon layer may be at least partially doped to exhibit electrical conductivity of a first type. The second top silicon layer may be at least partially doped to exhibit electrical conductivity of a second type. A doped region of the second top silicon layer may be at least in part directly over a doped region of the first top silicon layer. The first electro-optic phase modulator may also include a rib waveguide formed on the second top silicon layer, a first electric contact formed on the first top silicon layer, and a second electric contact formed on the second top silicon layer. When electric signals are applied on the first and second electric contacts, free carriers in the first electro-optic phase modulator may accumulate, deplete, or invert within the first and second top silicon layers on the first and second sides of the thin dielectric gate layer simultaneously. Moreover, a refractive index of the rib waveguide confining optical field may be modulated. That is, the phase of a guiding light may be modulated.

In some embodiments, at least one of the first top silicon layer and the second top silicon layer may be made of single-crystal silicon.

In some embodiments, the second arm 640 of the input optical waveguide splitter may include a second electro-optic phase modulator, e.g., silicon-based rib-waveguide modulator 100 or silicon-based rib-waveguide modulator 400 as described above. The second electro-optic phase modulator may include a first single-crystal top silicon layer, a second single-crystal top silicon layer, and a thin dielectric gate layer. The first single-crystal top silicon layer may be at least partially doped to exhibit electrical conductivity of the first type. The second single-crystal top silicon layer may be at least partially doped to exhibit electrical conductivity of the second type. A doped region of the second top silicon layer may be at least in part directly over a doped region of the first top silicon layer. The thin dielectric gate layer may be disposed between the first top silicon layer and the second top silicon layer.

The second electro-optic phase modulator may also include a rib waveguide formed on the second top silicon layer, a first electric contact formed on the first top silicon layer, and a second electric contact formed on the second top silicon layer. When electric signals are applied on the first and second electric contacts of the second electro-optic phase modulator, free carriers in the second electro-optic phase modulator may accumulate, deplete, or invert within the first and second top silicon layers on the first and second sides of the thin dielectric gate layer simultaneously. Additionally, a refractive index of the rib waveguide confining optical field may be modulated. That is, the phase of the guiding light may be modulated.

ADDITIONAL NOTES

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. An electro-optic device, comprising:
a silicon-based rib-waveguide modulator comprising:
   a first top silicon layer comprising a first doped region that is at least partially doped with dopants of a first conducting type;
   a second top silicon layer comprising a second doped region that is at least partially doped with dopants of a second conducting type, the second doped region of the second top silicon layer at least in part directly over the first doped region of the first top silicon layer;
   a thin dielectric gate layer disposed between the first top silicon layer and the second top silicon layer, the thin dielectric gate layer comprising a first side in contact with the first top silicon layer and a second side in contact with the second top silicon layer;
   a rib waveguide formed on the second top silicon layer;
   a first electric contact formed on the first top silicon layer; and
   a second electric contact formed on the second top silicon layer,
wherein, when electric signals are applied on the first and second electric contacts, free carriers accumulate, deplete, or invert within the first and second top silicon layers on the first and second sides of the thin dielectric gate layer simultaneously and a refractive index of the rib waveguide confining optical field is modulated.

2. The electro-optic device of claim 1, wherein at least one of the first top silicon layer and the second top silicon layer is made of single-crystal silicon.

3. A fabrication method of an electro-optic device, comprising:
   forming a first silicon-on-insulator (SOI) wafer that comprises a first silicon substrate, a first buried oxide (BOX) layer, and a first top silicon layer which is formed over the first BOX layer;
   performing a first ion-implantation process to form a first doped region in the first top silicon layer, the first doped region being at least partially doped with dopants of a first conducting type;
   performing a first thermal treat process to form a first thin dielectric layer over the first top silicon layer;
   preparing a second SOI wafer that comprises a second silicon substrate, a second BOX layer, and a second top silicon layer which is formed over the second BOX layer;
   performing a wafer bonding process to combine the first SOI wafer and the second SOI wafer, with the second top silicon layer bonded face-to-face to the thin dielectric layer;
   performing a grinding process and a first dry-etching process to remove the second silicon substrate of the second SOI wafer, using the second BOX layer as a stop layer for the first dry-etching process;
   performing a second dry-etching process to remove the second BOX layer, using the second top silicon layer as a stop layer for the second dry-etching process;
   performing a second ion-implantation process to form a second doped region in the second top silicon layer, the second doped region being at least partially doped with dopants of a second conducting type;
   performing a third dry-etching process to form a rib waveguide on the second top silicon layer; and
   performing a passivation process and a metallization process to form a first electric contact on the first top silicon layer and a second electric contact formed on the second top silicon layer.

4. The fabrication method of claim 3, further comprising:
   performing a second thermal treat process on the second SOI wafer to form a second thin dielectric layer over the second top silicon layer; and
   performing a wafer bonding process to combine the first SOI wafer and the second SOI wafer, with the second thin dielectric layer bonded face-to-face to the first thin dielectric layer.

5. A fabrication method of an electro-optic device, comprising:
   preparing a first silicon-on-insulator (SOI) wafer that comprises a first silicon substrate, a first buried oxide (BOX) layer, and a first top silicon layer which is formed over the first BOX layer;
   performing a first thermal treat process to form a first thin dielectric layer over the first top silicon layer;
   preparing a second SOI wafer that comprises a second silicon substrate, a second BOX layer, and a second top silicon layer which is formed over the second BOX layer;
   performing a wafer bonding process to combine the first SOI wafer and the second SOI wafer, with the second top silicon layer bonded face-to-face to the thin dielectric layer;
   performing a grinding process and a first dry-etching process to remove the second silicon substrate of the second SOI wafer, using the second BOX layer as a stop layer for the first dry-etching process;
   performing a second dry-etching process to remove the second BOX layer, using the second top silicon layer as a stop layer for the second dry-etching process;
   performing a third dry-etching process to form a rib waveguide on the second top silicon layer, wherein a window region of the second top silicon layer is etched down to the thin dielectric layer;
   performing a first ion-implantation process to implant, through the window region, impurities of a first type into the first top silicon layer;
   performing a third thermal treat process to cause lateral diffusion of the impurities of the first type to form a first conducting-type region in the first top silicon layer;
   performing a second ion-implantation process to form a second conducting-type region in the second top silicon layer with impurities of a second type; and
   performing a passivation process and a metallization process to form a first electric contact on the first top silicon layer and a second electric contact formed on the second top silicon layer.

6. The fabrication method of claim 5, further comprising:
   performing a second thermal treat process on the second SOI wafer to form a second thin dielectric layer over the second top silicon layer; and
   performing a wafer bonding process to combine the first SOI wafer and second SOI wafer, with the second thin dielectric layer bonded face-to-face to the first thin dielectric layer.

7. An electro-optic device, comprising:
a silicon-based rib-waveguide modulator comprising:
   a first top silicon region which is at least partially doped to exhibit electrical conductivity of a first type;
   a thick dielectric layer, having a thickness approximately identical to a thickness of the first top silicon region, the thick dielectric layer filling a space of a plane of the first top silicon region;

a second top silicon region which is at least partially doped to exhibit electrical conductivity of a second type, the second top silicon region at least in part directly over the first top silicon region;

a thin dielectric gate layer disposed between the first top silicon region and the second top silicon region, the thin dielectric gate layer comprising a first side in contact with the first top silicon region and a second side in contact with the second top silicon region;

a rib waveguide formed on the second top silicon region;

a first electric contact formed on the first top silicon region; and a second electric contact formed on the second top silicon region, wherein, when electric signals are applied on the first and second electric contacts, free carriers accumulate, deplete, or invert within the first and second top silicon regions on the first and second sides of the thin dielectric gate layer simultaneously and a refractive index of the rib waveguide confining optical field is modulated.

8. The electro-optic device of claim 7, wherein at least one of the first top silicon region and the second top silicon region is made of single-crystal silicon.

9. A fabrication method of an electro-optic device, comprising:

preparing a first silicon-on-insulator (SOI) wafer that comprises a first silicon substrate, a first buried oxide (BOX) layer, and a first top silicon layer which is formed over the first BOX layer;

performing a first ion-implantation process to form a first doped region in the first top silicon layer, the first doped region at least partially doped to exhibit electrical conductivity of a first type;

performing a first dry-etching process to etch parts of the first top silicon layer down to the first BOX layer to form a first top silicon region with at least a portion of the first doped region preserved;

performing a thick dielectric deposition process to form a thick dielectric layer with a thickness sufficient to entirely cover the first top silicon region;

performing a chemical-mechanical polishing (CMP) process to planarize the thick dielectric layer to remove a part of the thick dielectric layer that is above the first top silicon region;

performing a first thermal treat process to form a first thin dielectric layer over the first top silicon region;

preparing a second SOI wafer that comprises a second silicon substrate, a second BOX layer, and a second top silicon region which is formed over the second BOX layer;

performing a wafer bonding process to combine the first SOI wafer and the second SOI wafer with the second top silicon layer bonded face-to-face to the thin dielectric layer;

performing a grinding process and a second dry-etching process to remove the second silicon substrate of the second SOI wafer, using the second BOX layer as a stop layer for the second dry-etching process;

performing a third dry-etching process to remove the second BOX layer, using the second top silicon region as a stop layer for the third dry-etching process;

performing a second ion-implantation process to form a second doped region in the second top silicon region, the second doped region at least partially doped to exhibit electrical conductivity of a second type, the second doped region at least in part directly over the first doped region;

performing a fourth dry-etch process to form the rib waveguide on the second top silicon region; and performing a passivation process and a metallization process to form a first electric contact on the first top silicon region and a second electric contact formed on the second top silicon region.

10. The fabrication method of claim 9, further comprising:

performing a second thermal treat process on the second SOI wafer to form a second thin dielectric layer over the second top silicon layer; and performing a wafer bonding process to combine the first SOI wafer and second SOI wafer, with the second thin dielectric layer bonded face-to-face to the first thin dielectric layer.

11. A Mach-Zehnder interferometer, comprising:

an input optical waveguide splitter comprising a first arm, a second arm, and an input waveguide part optically coupled to the first arm and the second arm which are positioned in parallel; and an output optical waveguide combiner comprising an output waveguide part optically coupled to the first arm and the second arm of the input optical waveguide splitter, wherein the first arm of the input optical waveguide splitter comprises a first electro-optic phase modulator, the first electro-optic phase modulator comprising:

a first top silicon layer which is at least partially doped to exhibit electrical conductivity of a first type;

a second top silicon layer which is at least partially doped to exhibit electrical conductivity of a second type, a doped region of the second top silicon layer being at least in part directly over a doped region of the first top silicon layer;

a thin dielectric gate layer disposed between the first top silicon layer and the second top silicon layer;

a rib waveguide formed on the second top silicon layer;

a first electric contact formed on the first top silicon layer; and a second electric contact formed on the second top silicon layer, wherein, when electric signals are applied on the first and second electric contacts, free carriers accumulate, deplete, or invert within the first and second top silicon layers on the first and second sides of the thin dielectric gate layer simultaneously and a refractive index of the rib waveguide confining optical field is modulated.

12. The Mach-Zehnder interferometer of claim 11, wherein at least one of the first top silicon layer and the second top silicon layer is made of single-crystal silicon.

13. The Mach-Zehnder interferometer of claim 11, wherein the second arm of the input optical waveguide splitter comprises a second electro-optic phase modulator, the second electro-optic phase modulator comprising:

a first single-crystal top silicon layer which is at least partially doped to exhibit electrical conductivity of the first type;

a second single-crystal top silicon layer which is at least partially doped to exhibit electrical conductivity of the second type, a doped region of the second top silicon layer being at least in part directly over a doped region of the first top silicon layer;

a thin dielectric gate layer disposed between the first top silicon layer and the second top silicon layer;

a rib waveguide formed on the second top silicon layer;
a first electric contact formed on the first top silicon layer; and
a second electric contact formed on the second top silicon layer,
wherein, when electric signals are applied on the first and second electric contacts of the second electro-optic phase modulator, free carriers accumulate, deplete, or invert within the first and second top silicon layers on the first and second sides of the thin dielectric gate layer simultaneously and a refractive index of the rib waveguide confining optical field is modulated.

* * * * *